March 11, 1924.
M. C. KING
ELECTRIC CONNECTION
Filed Sept. 26, 1921
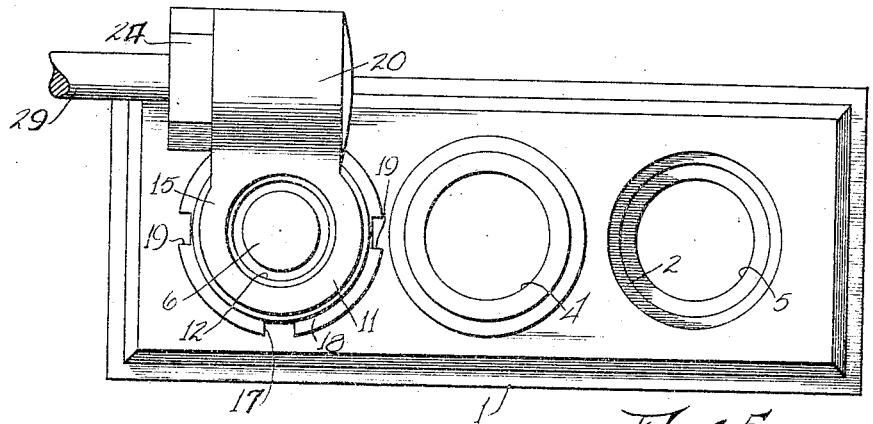
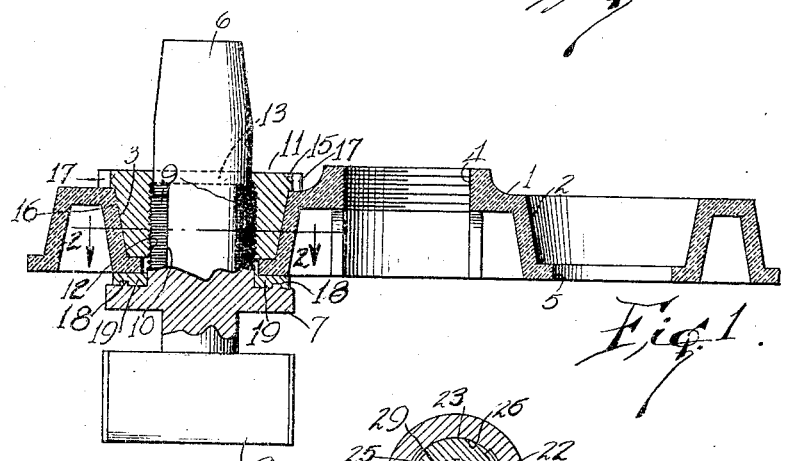
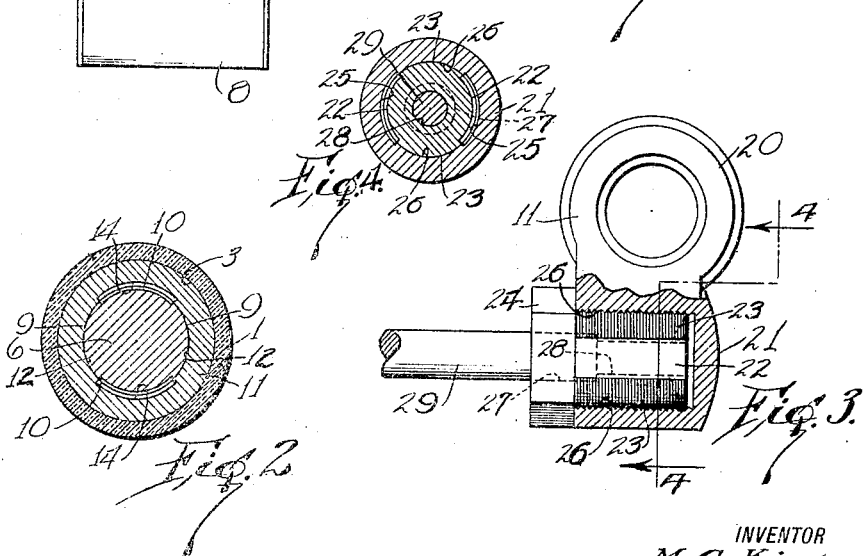
INVENTOR
M. C. King
BY
ATTORNEYS Patented Mar. 11, 1924.

1,486,250

UNITED STATES PATENT OFFICE.

MELVIN C. KING, OF CHICAGO, ILLINOIS.

ELECTRIC CONNECTION.

Application filed September 26, 1921. Serial No. 503,215.

*To all whom it may concern:*

Be it known that I, MELVIN C. KING, a subject of the King of England, (who has signified his intention of becoming a citizen of the United States), and a resident of Chicago, in the county of Cook and State of Illinois, have invented a new and useful Improvement in Electric Connections, of which the following is a full, clear, and exact description.

My invention relates generally to connections in which two members are detachably coupled together, and it consists in the combinations, constructions and arrangements herein described and claimed:

An object of my invention is to provide a connection whereby two cooperatively threaded members, both of which are formed of a relatively soft material, such as lead, can be connected together and disconnected at will without occasioning the shearing of the threads of the relatively soft members.

A further object of my invention is to provide a connection of the character described that is particularly well adapted for application to covers of storage battery cells, whereby the necessity for permanently attaching a lead terminal of the cell to the cover is obviated.

A further object of my invention is to provide a device of the character described which when embodied in a terminal connection for a storage battery cell will permit of an electrical conducting member being detached from a lead terminal and the displacement of the terminal at will, whereby the plates of the cell may be renewed without necessitating the provision of a new terminal.

Other objects and advantages will appear in the following specification, and the novel features of the invention will be particularly pointed out in the appended claim.

My invention is illustrated in the accompanying drawings, forming part of this application, in which—

Fig. 1 is a central, vertical section through a cover for a storage battery cell and through an embodiment of the invention applied thereto, Fig. 2 is a section along the line 2—2 of Fig. 1, Fig. 3 is a plan view of a terminal connector formed in accordance with my invention, portions thereof being broken away and other portions being shown in section, Fig. 4 is a section along the line 4—4 of Fig. 3, and Fig. 5 is a plan view of the elements illustrated in Figures 1 and 3 arranged in desired relative positions.

It is well known that two cooperatively threaded members which are formed of a relatively soft material, such as lead, cannot be connected together and disconnected repeatedly without occasioning the shearing or stripping of the threads of the members. On account of this fact, it has heretofore been necessary to permanently attach lead terminals of a storage battery cell to the cooperating member which engages the cover of a cell to maintain the lead terminal in position. As a result, a lead terminal of a storage battery cell could not be used after the plates attached thereto had become unfit for further use. I am aware that a nut adapted for engagement with the threaded lead terminal has been made prior to my invention and that it is claimed that this nut on account of the pitch of its threads can be screwed on the threaded lead terminal and removed therefrom at will. It has been shown in practice, however, that this nut will occasion the stripping of the threads on the lead terminal and will not satisfy the requirements of the service for which intended, which requirements are fully met when my invention is carried into effect.

Referring now particularly to Figures 1, 2 and 5, 1 denotes a cover for the jar (not shown) of a storage battery cell. The cover 1 is formed of a suitable insulating material and is fashioned to provide concavities 2 and 3 at opposite sides of a threaded filler opening 4. An opening 5 is formed through the bottom of each of the concavities 2 and 3 and is adapted to receive a portion of a lead terminal 6. The latter is fashioned with an annular flange 7 adjacent to its lower end and is formed integral with or rigidly connected to plate holding straps 8 at its lower end. The parts described so far are ordinary in construction and form no part of my invention, except in so far as they cooperate with the parts which will be hereinafter described. In terminal connectors for storage battery cells of ordinary construction, of which I am aware, the lead terminal 6 has the portion protruding through the opening 5 threaded exteriorly and a member having a portion threaded interiorly is forced on the threaded terminal 6 into contact with the upper face of the cover 1. The threads of the lead terminal 6 are usually stripped and warped when the connector is formed into engagement therewith, whereby the connector cannot be detached from the terminal 6 without the use of tools and without rendering the terminal 6 unfit for further use. Moreover, it is usually necessary to permanently attach the aforesaid member to the terminal 6 in adjusted position by the use of solder or by brazing in order to prevent play between the terminal 6 and the cover on account of the impairment of the threads of the terminal. I have found that a lead retaining nut can be applied to the lead terminal 6 to co-act with the cover 1 in supporting the lead terminal 6 in adjusted position and that the retaining nut can be removed from the terminal at will when the lead terminal 6 and the lead retaining nut are formed in accordance with my invention. To this end I cut away portions of the threads of the lead terminals 6 until segmental portions 9—9 of the threads remain and diametrically opposed guideways 10—10 extending longitudinally of the terminal 6 are provided. A retaining nut indicated generally at 11 and formed of lead is provided with a bore having threads cut away to provide diametrically opposite guideways 14—14 and segmental thread portions 12—12 adapted to slidably fit in the guideways 10—10. An integral annular sealing flange or rib 13 extends inwardly from the bore of the nut 11 at the upper end of the retaining nut 11 and has a function which will be hereinafter set forth. The retaining nut 11 is formed to provide an integral outwardly extending flange 15 at the upper end thereof and with its outer wall reduced at 16 adjacent to the upper end thereof and fashioned to conformably fit within the concavity 3, whereby the flange 15 will overlie the margin of the concavity 3 when the nut is in adjusted position, as best seen in Fig. 1. Notches 17 are formed in the outer edge of the flange 15 and are adapted for engagement with a spanner wrench or like tool for turning the retaining nut on the terminal 6.

From the foregoing description of the various parts of the device, the operation thereof may be readily understood. The flange 7 is fashioned with an annular rib 18 on its upper face and a gasket 19 is disposed on the lead terminal 6 between the flange 7 and the under side of the cover 1. The nut 11 is then projected over the upper end of the lead terminal 6 and is turned relatively to the lead terminal 6 until the threads on the nut are received within the guideways on the lead terminal 6, when the nut can be slidably moved downwardly along the threaded portion of the lead terminal 6. When the lower end of the nut 11 has been moved into contact with the upper side of the cover 1, it is turned to cause the engagement of the threaded portions of the nut and of the lead terminal. The pitch of the threads of the nut, and of the terminal 6, is such as to insure a relatively great axial or endwise movement of the nut for each revolution thereof and in consequence the terminal 6 will be securely held in the position illustrated in Fig. 1 when the nut is turned about one-fourth of a revolution. Moreover, neither the threads of the nut 11 nor the threads of the terminal 6 will be sheared or stripped when the nut is moved into locked position on the terminal in the manner described. The inwardly extending sealing flange 13 closely contacts the terminal 6 at all points and prevents the passage of dust or the like along the guideways between the terminal and the nut. Were the sealing flange not provided, gritty substances might pass between the nut and the terminal when these parts are in the position illustrated in Fig. 1, whereby injury to the soft threads would probably result.

Referring now particularly to Figures 3, 4 and 5, I show a terminal connector formed in accordance with my invention. A tubular lead sleeve 20 adapted to fit on the terminal and to be secured in superposed position on the nut 11 in any suitable known manner has an integral laterally extending portion fashioned into a socket 21. The socket 21 is formed with arcuate segmental thread portions 23—23 and with opposite guideways 22—22. A plug 24 has a shank portion fashioned with segmental thread portions 26—26 adapted to the guideways 22—22 and with guideways 25—25 adapted to receive the thread portions 23—23 of the socket. The plug 24 has a bore 27 reduced at 28. An insulated conducting cable 29 is projected into the bore 27 of the plug and the wires of the cable are extended within the reduced portion 28 of the bore to the end of the plug, at which point they are permanently attached to the plug by soldering or brazing.

It will be manifest that the plug 24 can be inserted into the socket 21 and will be secured therein when turned about one-fourth of a revolution. Such a movement will not twist the wires of the cable sufficiently to impair the connection of such wires with the plug.

It will be understood that parts precisely identical with those described as being received in the opening 5 of the concavity 3 will also be disposed in the opening 5 of the concavity 2 and that the invention is not restricted to the application illustrated and described but may be embodied in co-engaging threaded elements formed of relatively soft material and adapted for various uses without departing from the spirit and scope of the invention.

The gasket 19 will be clamped between the flange 7 and the under side of the cover 1, thereby causing the rib 18 to be impressed in the gasket 19 and insuring a liquid tight connection between the lead terminal 6 and the cover 1.

I claim:

A device of the character described comprising a lead terminal member, a lead retaining nut, said terminal member and said nut being formed with a plurality of cooperating segmental threads of relatively low pitch on the contacting wall, whereby the terminal may be inserted into the retaining nut and the latter moved into threaded engagement with said terminal when rotated less than a complete revolution, and means integral with said nut for engaging the upper side wall of said terminal to occasion a liquid-tight contact between said nut and said terminal member.

MELVIN C. KING.